Patented Aug. 29, 1944

2,357,172

UNITED STATES PATENT OFFICE 2,357,172

MONO-GLYCOSIDES OF 2-METHYL-1,4-NAPHTHOHYDROQUINONE

Gustaf H. Carlson, Pearl River, and Bernard R. Baker, Nanuet, N. Y., assignors to Lederle Laboratories, Inc., New York, N. Y., a corporation of Delaware No Drawing. Application November 1, 1941, Serial No. 417,473

3 Claims. (Cl. 260—210)

This invention relates to a new class of compounds having an anti-hemorrhagic activity and more particularly relates to a class of anti-hemorrhagic compounds which are suitable for either oral or parenteral administration.

One of the most active anti-hemorrhagic compounds of the vitamin K type is 2-methyl-1,4-naphthoquinone, and it is very widely used in the treatment of hypoprothrombinemia and the hemorrhagic diathesis of the newly born and in the treatment of post-operative bleeding in jaundice or persons having prothrombin deficiencies.

There is one disadvantage concerning the use of 2-methyl-1,4-naphthoquinone, however, and that is its extreme insolubility in water. In many cases it is undesirable to administer the quinone orally, particularly when new born infants are being treated, and to overcome this difficulty in the past suspensions of the naphthoquinone in olive oil, cottonseed oil, or other fixed oils, have been employed for intra-muscular or subcutaneous injections. It is readily seen, therefore, that it would be desirable to have available an anti-hemorrhagic substance which may be administered by the oral route and which would, at the same time, be sufficiently soluble in water to permit the administration by intra-muscular or intravenous injection.

In accordance with the present invention we have discovered that a new class of compounds comprising the mono-glycosides of 1,4-dihydroxy-2-methylnaphthalene possess an anti-hemorrhagic activity and may be administered either orally or parenterally in aqueous solutions, and no undesirable effects are produced.

A general method for preparing the mono-glycosides of 1,4-dihydroxy-2-methylnaphthalene comprises the preparation of the mono-acetate of 2-methyl-1,4-naphthohydroquinone and conversion of this mono-acetate to the acetylated mono-glycosides using bromo glucose tetra-acetate, bromo maltose hepta-acetate, or other aceto bromo sugars, and then completely de-acetylating to give the corresponding mono-glycoside.

Suitable methods for preparing the mono-glycosides of 1,4-dihydroxy-2-methylnaphthalene will be fully illustrated in conjunction with the following specific examples. It should be understood, however, that these examples are given merely by way of illustration and the invention is not to be limited to the details set forth therein.

Mono-acetate of 2-methyl-1,4-naphthohydroquinone

A solution of 7.6 grams of the di-acetate of 2-methyl-1,4-naphthohydroquinone in 75 cc. of methanol was treated with 2 cc. of 28% ammonia water. After twenty-four hours at room temperature the product was precipitated with water and the organic solid was dissolved in chloroform. The chloroform solution was concentrated and the mono-acetate crystallized by dilution with petroleum ether, M. P. 125.5–126.5° C. uncorrected.

In a slightly modified process a mixture of 50 grams of 2-methyl-1,4-naphthoquinone, 15 grams of anhydrous sodium acetate, 100 mg. of platinum oxide catalyst and 150 cc. of acetic anhydride was shaken in an atmosphere of hydrogen until one mole equivalent of hydrogen had been absorbed. Acetic anhydride (100 cc.) and 1 gram of zinc dust were added and the mixture was boiled for fifteen minutes. The filtered solution was added to cold water, the precipitated di-acetate was filtered off and treated with 22 cc. of 28% ammonia water in 450 cc. of methanol at 45° C. After twenty hours in an atmosphere of nitrogen and at room temperature, the product was precipitated with water and dissolved in chloroform. The solution was washed with water, evaporated to a small volume in vacuo and the mono-acetate was crystallized by addition of carbon tetrachloride. After several hours at 5° C. the product was filtered off and washed with carbon tetrachloride until the filtrate was colorless. Yield of mono-acetate, 42 grams, M. P. 124.5°–125.8° C. uncorrected.

Acetoxy-2-methylnaphthyl glucoside tetra-acetate

A solution of 8 grams of glucose penta-acetate in 11 cc. of acetic acid was saturated with hydrogen bromide at 25° C. After two hours the solution was diluted with 50 cc. of chloroform and the solution was washed twice with ice water (100 cc.), with cold saturated sodium bicarbonate solution and was then dried with calcium chloride. The dry solution was added to 4.8 grams of the mono-acetate of 2-methyl-1,4-naphthohydroquinone, 75 cc. of reagent acetone and 15 grams of anhydrous potassium carbonate. After twenty hours at room temperature, the mixture was boiled four hours, insoluble salts were filtered off and solvent was distilled in vacuo from the filtrate. The residue was crystallized from methanol and yielded 2.6 grams of the acetylated glucoside, M. P. 184–186° C. uncorrected.

The preparation of acetoxy-2-methylnaphthyl glucoside tetraacetate was also achieved under slightly modified conditions and in a more satisfactory manner as follows:

A solution of 46.5 grams of glucose penta-acetate in 60 cc. of glacial acetic acid was saturated with hydrogen bromide at 25° C. After 15-20 hours the solution was diluted with 200 cc. of chloroform, washed twice with ice water (1 liter) and was then dried with calcium chloride. The dry solution was added to 21 grams of the mono-acetate of 2-methyl-1,4-naphthohydroquinone, 180 cc. of reagent acetone and 60 grams of anhydrous potassium carbonate. After twenty-four hours at room temperature, the insoluble salts were filtered off and solvent was distilled in vacuo from the filtrate. The residue was crystallized from methanol and yielded 17 grams of the acetylated glycoside. Essentially the same yield was obtained in subsequent preparations and the product melted at 180-181° C. uncorrected.

*Hydroxy-2-methylnaphthyl mono-glucoside*

A suspension of 2 grams of acetoxy-2-methylnaphthyl glucoside tetra-acetate in 20 cc. of methanol containing 5 mg. of dissolved sodium was boiled three hours, the solution was evaporated in vacuo to a volume of 7 cc., and after fifteen to twenty hours at 5° C. the solution deposited the crude mono-glucoside which was washed with a methanol-ethyl acetate solution and recrystallized from water. Yield, 0.8 grams, M. P. 204°-206° C. uncorrected.

The de-acetylation was effected more readily by boiling the reaction mixture one hour, acidifying with acetic acid, evaporating to dryness in vacuo, and triturating the residual mono-glucoside with ethyl acetate. Yield, 1.1 grams. Essentially the same yield was obtained in a de-acetylation of 15 grams of the acetylated glucoside.

Aqueous solutions of the mono-glucoside are preferably sterilized by adequate filtration, but they may also be heated especially if the solution is stabilized with a molecular equivalent of a reducing agent, such as sodium bisulfite. A solution prepared from 10 mg. of the mono-glucoside and 1 cc. of warm water remained perfectly clear after one month at 0-5° C. and hence solutions of satisfactory stability and concentration required for therapeutic use can be readily prepared. Biochemical assay on chicks has shown that at a level of 3 micrograms, the activity of the mono-glucoside is comparable to that of 2-methyl-1,4-naphthoquinone and response was obtained at a level of 1 microgram.

*Acetoxy-2-methylnaphthylmaltoside hepta-acetate*

Maltose (15 grams) was treated with 30 cc. of acetyl bromide and, when the reaction appeared to be complete, 10 cc. of acetic acid was added to the mixture. After two hours at room temperature, the product was poured into 750 cc. of water and the acetate was extracted with ether. The ether solution was washed with water, dried and added to 4.6 grams of the mon-acetate of 2-methyl-1,4-naphthohydroquinone, 16 grams of anhydrous potassium carbonate and 75 cc. of reagent acetone. After twenty-four hours, inorganic salts were filtered off and solvent was evaporated in vacuo from the filtrate. The residue was dissolved in ether, the solution was extracted repeatedly with 2% sodium hydroxide solution and was then washed with water. Evaporation of the ether solution then left a residue which was crystallized from methanol and yielded 0.6 grams of the acetylated maltoside, M. P. 173-175° C. uncorrected.

An improvement in the yield was obtained by the following procedure. A solution of 16 grams of maltose octa-acetate in 55 cc. of glacial acetic acid was treated with 30 cc. of glacial acetic acid saturated with hydrogen bromide at 0° C. After one-half hour at 0° C., the product was diluted with 65 cc. of chloroform and the solution was washed with water. The dried chloroform solution was added to 11 grams of the mono-acetate of 2-methyl-1,4-naphthohydroquinone, 100 cc. of reagent acetone and 20 grams of anhydrous potassium carbonate. After twenty-one hours, the inorganic salts were filtered off, the filtrate was washed with water, with two portions (100 cc. each) of 2% sodium hydroxide and solvent was distilled in vacuo from the chloroform solution. The residue, crystallized from methanol, yielded 6.2 grams of acetylated maltoside, M. P. 181-184° C. uncorrected after recrystallization from chloroform-methanol solution.

In a similar preparation the yield was somewhat improved and the operations simplified. A solution of bromo-acetomaltose (prepared from 76 grams of maltose octa-acetate) in 200 cc. of chloroform was treated with 25 grams of the mono-acetate of 2-methyl-1,4-naphthohydroquinone, 200 cc. of acetone and 60 grams of anhydrous potassium carbonate. After twenty-four hours at room temperature the mixture yielded 29.5 grams of crude acetylated maltoside, M. P. 183-184° C. uncorrected after recrystallization from benzene-heptane solution.

*Hydroxy-2-methylnaphthyl mono-maltoside*

A suspension of 2 grams of the corresponding octa-acetate in 20 cc. of methanol containing 15 mg. of dissolved sodium was boiled one hour, the solution was acidified with acetic acid and solvent was evaporated in vacuo. The residue was extracted with ethyl acetate and the undissolved mono-maltoside was recrystallized from water.

The hydrolyzed product obtained from 10 grams of the acetylated maltoside was treated with active charcoal and recrystallized from hot water. Yield, 2.7 grams.

On concentration in vacuo, the mother liquor yielded 0.7 grams more of the mono-maltoside. At least 15 mg. of the mono-maltoside will dissolve per cc. of water at room temperature and, accordingly, solutions of required strength for therapeutic use are easily prepared. Bioassay has shown that at levels of 5 micrograms the activity of the mono-maltoside is comparable with that of 2-methyl-1,4-naphthoquinone and response was obtained at levels as low as 1 microgram. The aqueous solutions may be sterilized by filtration or by autoclaving and are then preferably stabilized by the addition of traces of sodium bisulfite or other adequate reducing agent.

In the foregoing examples the aceto bromo glucose and maltose derivatives may be replaced by other aceto bromo sugars and other mono-glycosides of 1,4-dihydroxy-2-methylnaphthalene obtained. Representative compounds that may be used include aceto bromo arabinose, aceto bromo xylose, aceto bromo galactose, aceto bromo cellobiose, aceto bromo lactose, and the like.

In the preparation of the compounds of our invention it may be possible to utilize mono-acyl derivatives of 2-methyl-1,4-naphthohydroquinone other than the mono-acetate and similarly the use of other acylated bromo sugars is not precluded.

What we claim is:

1. A method for preparing a mono-glycoside of 1,4-dihydroxy-2-methylnaphthalene which comprises preparing an acetoxy-2-methyl naphthyl glycoside polyacetate by reacting an aceto bromo sugar in chloroform with the mono-acetate of 2-methyl-1,4-hydroquinone in acetone and in the presence of an alkali metal carbonate under anhydrous conditions, and subsequently de-acetylating the acetoxy-2-methyl naphthyl glycoside polyacetate by boiling with methanol containing dissolved sodium.

2. A method for preparing a mono-glucoside of 1,4-dihydroxy-2-methylnaphthalene which comprises preparing an acetoxy-2-methyl naphthyl glucoside tetra-acetate by reacting bromo glucose tetra-acetate in chloroform with the mono-acetate of 2-methyl-1,4-hydroquinone in acetone and in the presence of an alkali metal carbonate under anhydrous conditions, and subsequently de-acetylating the acetoxy-2-methyl naphthyl glucoside tetra-acetate by boiling with methanol containing dissolved sodium.

3. A method for preparing a mono-maltoside of 1,4-dihydroxy-2-methylnaphthalene which comprises preparing an acetoxy-2-methyl naphthyl maltoside hepta-acetate by reacting bromo maltose hepta-acetate in chloroform with the mono-acetate of 2-methyl-1,4-hydroquinone in acetone and in the presence of an alkali metal carbonate under anhydrous conditions, and subsequently de-acetylating the acetoxy-2-methyl naphthyl maltoside hepta-acetate by boiling with methanol containing dissolved sodium.

GUSTAF H. CARLSON.
BERNARD R. BAKER.